Oct. 11, 1960 R. P. JONAS ET AL 2,955,811
STRAIN GAUGE WEIGHING BALANCE
Filed Dec. 7, 1956
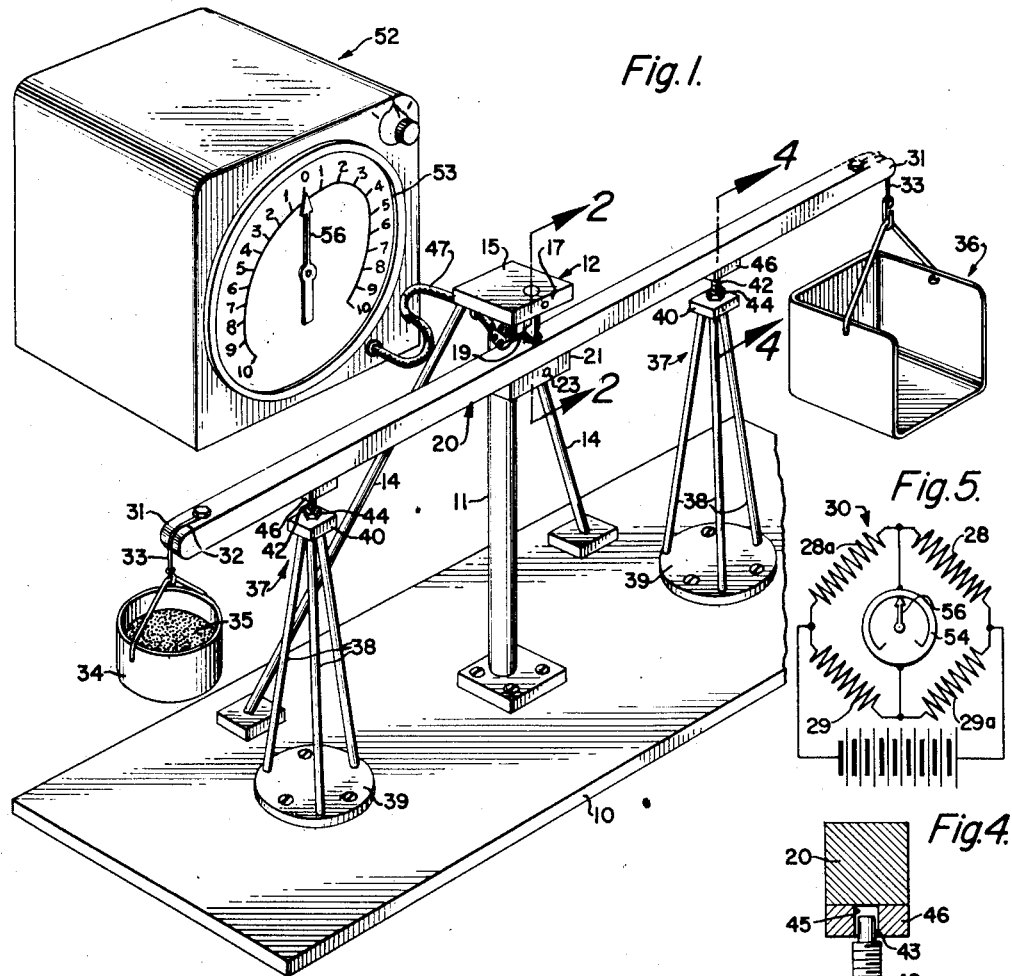
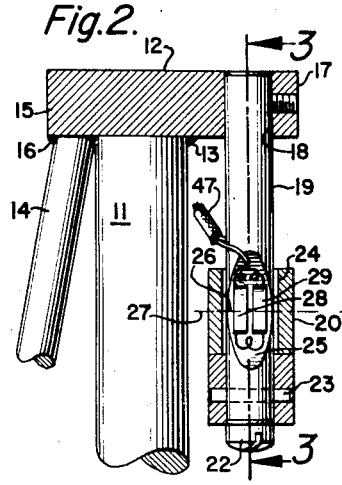
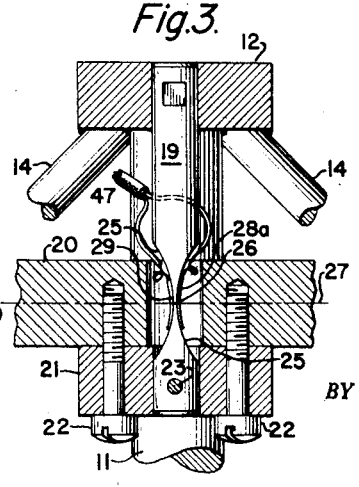
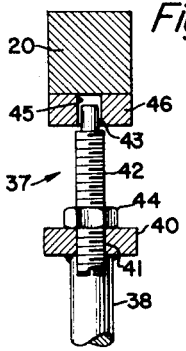
PETER N. DESARIO,
ROBERT P. JONAS,
INVENTORS.
BY John H. J. Wallace

United States Patent Office 2,955,811
Patented Oct. 11, 1960

2,955,811

STRAIN GAUGE WEIGHING BALANCE

Robert P. Jonas and Peter N. De Sario, Phoenix, Ariz., assignors to The Garrett Corporation, Los Angeles, Calif., a corporation of California Filed Dec. 7, 1956, Ser. No. 626,903

2 Claims. (Cl. 265—54)

This invention relates to weighing balances and particularly to a balance which will accurately indicate a minute difference in the weights of comparatively heavy items.

The principal object of this invention is to provide a balance which will accurately measure minute differences in the weights of relatively heavy items by means of electrical strain gauges.

Another object of the present invention is to provide a weighing balance of more simplified construction which effectively utilizes electrical strain gauges combined with visual indicating means to register the slightest unbalance of a balance beam in either direction.

A further object of this invention is to provide a horizontally disposed rigid balance beam adapted to support an object on each of its ends, said beam being suspended by a vertically disposed flexible member located intermediate the ends of the beam, the flexible member being provided with resistance strain gauges connected electrically to an indicator, whereby the direction and amount of unbalance of said beam are visually recorded.

Other objects and advantages of the present invention will be apparent from the embodiment exemplified in the accompanying specification and drawings in which:

Fig. 1 is a perspective view showing one form of the invention;

Fig. 2 is an enlarged fragmentary vertical cross-sectional view taken on the line 2—2 of Fig. 1;

Fig. 3 is a fragmentary vertical section taken on the line 3—3 of Fig. 2;

Fig. 4 is an enlarged fragmentary vertical cross-sectional view taken on the line 4—4 of Fig. 1 and Fig. 5 is a diagrammatic view of a bridge circuit which is used with the balance.

Referring now in detail to the embodiment of the invention illustrated in Figs. 1 to 5 of the drawing the improved balance includes a base 10 which has an upstanding post 11 mounted approximately centrally on the base. A support plate 12 is horizontally disposed and secured to the upper portion of the post 11 by any desired means, such as welds 13. Bracing members 14 are each secured at one end to a rearward overhanging portion 15 of the support plate 12 by any desired means such as welds 16. The bracing members 14 are secured at their opposite ends to the base plate 10 so as to form a rigid tripod support with the post 11. A forward overhang portion 17 of the plate 12 is provided with an aperture 18 adapted to receive and retain a supporting bar 19 suspended therefrom. A rigid balance beam 20 is horizontally disposed and fixed to a support block 21 by any desired means, such as screws 22. The block 21 is in turn rigidly secured to the lower end of the bar 19 by a press fit and a suitable pin 23. A central aperture 24 is provided in the rigid balance beam 20 for free passage therethrough of the supporting bar 19.

Arcuate concave recessed portions 25 are provided on each side of the bar 19 to form a thin, flexible, suspension or fulcrum member, best shown at 26 in Fig. 3 of the drawing. It should be noted that the surfaces of the arcuate concave recessed portions 25 face opposite ends of the rigid balance beam 20. Preferably, the thinnest portion of the flexible fulcrum member 26 is located so as to coincide with the center of gravity of the rigid balance beam 20 as indicated by the intersection point of the dot and dash conterlines 27 in Figs. 2 and 3 of the drawing. This will cause the center of gravity of the balance beam to remain substantially in the same position even when the beam 20 is disposed in slight angularity relative to the horizontal.

Suitable strain guages 28 and 29 are bonded to one side of the fulcrum member 26 of the bar 19 and strain gauges 28a, 29a are bonded to the opposite side thereof. This bonding operation is done before assembly of the bar 19 with the support plate 12. These strain gauges are also electrically connected together so as to form a strain gauge bridge circuit 30. The circuitry involved is well known in the art and forms no part of the present invention.

Each of the ends 31 of the rigid balance beam 20 is rounded and provided with a groove 32 for the retention of a wire 33 in position therein. A container 34, adapted to hold weights 35, such as small lead pellets or grains of sand, is attached to one wire 33 suspended from one end 31 of the beam 20. The wire 33 on the opposite end of the beam 20 is adapted to retain a platform 36 for supporting an object whose weight is to be compared with the weights 35.

Suitable combined guide and stop members indicated generally at 37 limit the movement of the rigid balance beam 20. These guides consist of rods 38 mounted on plates 39 which are in turn fastened to the base 10. Blocks 40, provided with threaded holes 41, are secured to the uppermost portions of the rods 38. Studs 42 each having a reduced diameter portion 43 at one end are threaded into the holes 41 and provided with locknuts 44. The reduced diameter portions 43 of the studs 42 are adapted to fit loosely into apertures 45 in guide plates 46 attached to the understide of the rigid balance beam 20. The studs 42 may be adjusted vertically to limit the movement of the balance beam 20 to a desired minimum.

A cable 47 contains the necessary flexible leads from the strain gauge bridge circuit 30 to an amplifier and indicator housing 52 having a dial 53 on its face. The necessary electrical components are preferably contained within the housing and a pointer 56, may be actuated by a very sensitive galvanometer movement 54 in a circuit such as shown diagrammatically in Fig. 5.

In describing the operation of the present balance, let us assume that it is desired to determine the relatively small amount of oil consumed by a heavy machine during a period of operation. The weight of the sealed machine containing a supply of oil is first carefully balanced against the weights 35 so that the pointer 56 registers on zero. After running the machine for a desired period, it is again balanced against the same weights 35 and the oil consumed will be indicated on the dial 53 by the pointer 56.

Should it be desired to determine the moisture absorption of a certain material, substantially the same procedure is followed. The material is weighed before and after exposure to conditions of moisture and the difference in weight will be indicated on the dial 53 by the pointer 56 but in the opposite direction, as an increase in weight rather than as a decrease. The balance shown and described is adapted to detect changes in weight of one hundredth of an ounce or less, in machines weighing approximately fifty pounds or more. The thin flexible suspension or fulcrum member 19 provides means whereby the strain gauges are mounted so as to be very sensitive to the slightest unbalance of the rigid balance beam 20. The balance beam need move only imperceptibly for the unbalance to be magnified and visually indicated on the dial 53.

We claim:

1. In a weighing device of the comparator type, the combination of: a horizontally disposed rigid balance beam having two spaced apart ends, means at each of said ends for supporting weights to be compared with each other, a bar provided with arcuate concave recessed portions intermediate its ends on opposite sides thereof, said sides being in alignment with said beam center, said bar forming a flexible suspension member for said rigid balance beam and fixed thereto at a point intermediate said ends, means supporting said bar in tensile stress, an electrical strain gauge bonded within each of the arcuate concave recessed portions of said bar and disposed to indicate strain therein due to any unbalance between the ends of said rigid balance beam, and an indicator electrically coupled to said strain gauges and adapted to measure the variation in electrical characteristics of said strain gauges upon the occurrence of any unbalance between the two ends of said rigid balance beam.

2. In a weighing device of the comparator type, the combination of: a horizontally disposed rigid balance beam having two spaced apart ends, means at each of said ends for supporting weights to be compared with each other, a bar provided with arcuate recessed portions on opposite sides thereof in alignment with said rigid balance beam, said bar fastened to said rigid balance beam at a point intermediate said ends, means for supporting said bar in tensile stress, an electrical strain gauge bonded within each of said arcuate recessed portions of said bar and disposed to indicate strain therein due to any unbalance between the ends of said rigid balance beam, a bridge circuit coupled to said strain gauges, and a visual indicator adapted to measure the variation in electrical conductivity of said bridge circuit and to visually indicate the direction and amount of unbalance in units of weight.

References Cited in the file of this patent

UNITED STATES PATENTS

| | | |
|---|---|---|
| 246,057 | Abbott | Aug. 23, 1881 |
| 2,598,812 | Marco et al. | June 3, 1952 |
| 2,616,683 | Le Fevre | Nov. 4, 1952 |
| 2,680,373 | Bechberger | June 8, 1954 |
| 2,681,566 | Ruge | June 22, 1954 |
| 2,772,569 | Ruge | Dec. 4, 1956 |
| 2,795,134 | Weber et al. | June 11, 1957 |
| 2,796,503 | Ward | June 18, 1957 |